United States Patent [19]
Mohr

[11] 3,799,435
[45] Mar. 26, 1974

[54] HEATING AND VENTILATING PLANT FOR MOTOR VEHICLES
[75] Inventor: Paul Mohr, Wolfsburg, Germany
[73] Assignee: Volkswagenwerk Aktiengesellschaft, Wolfsburg, Germany
[22] Filed: Aug. 22, 1972
[21] Appl. No.: 282,845

[30] Foreign Application Priority Data
Sept. 1, 1972   Germany............................ 2142732

[52] U.S. Cl. ............................ 237/12.3 A, 98/2.06
[51] Int. Cl. ............................................. B60h 1/02
[58] Field of Search................... 237/12.3 A, 12, 81; 98/2.06, 2.08

[56] References Cited
UNITED STATES PATENTS
1,441,486   1/1923   Denman-Jones............... 237/12.3 A
2,717,045   9/1955   Nallinger....................... 237/12.3 A Primary Examiner—William E. Wayner
Attorney, Agent, or Firm—Brumbaugh, Graves, Donohue & Raymond

[57] ABSTRACT

A heating and ventilating system for vehicles with a connection from the intake air receiving area to the outer surface of the vehicle. The area on the outer surface of the vehicle to which the connection is made is subject to a pressure which, being less than atmospheric pressure as a result of the vehicle movement, varies inversely as the speed of the vehicle.

5 Claims, 3 Drawing Figures

PATENTED MAR 26 1974 3,799,435

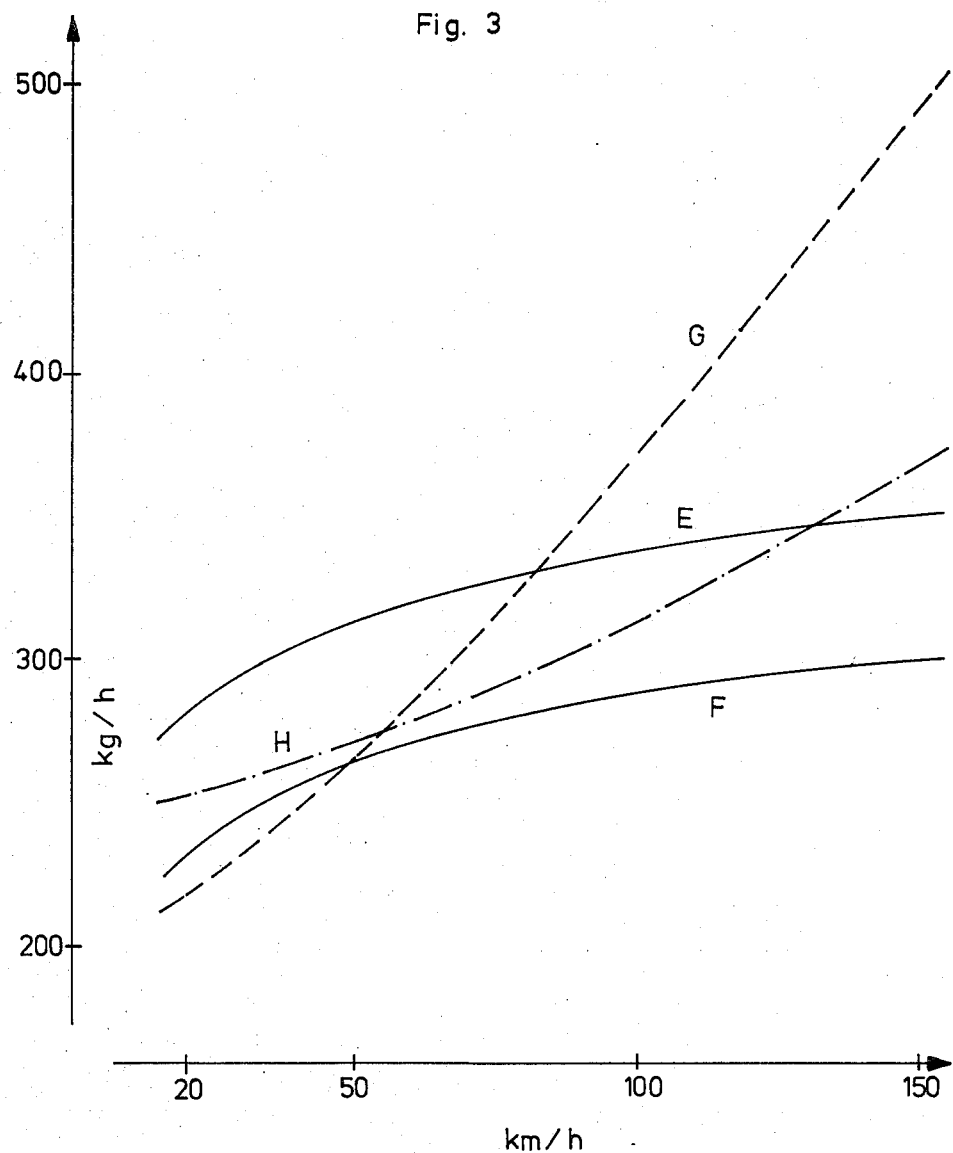

HEATING AND VENTILATING PLANT FOR MOTOR VEHICLES

BACKGROUND OF THE INVENTION

This invention relates to heating and ventilating systems for vehicles and, more specifically, to a simple and highly effective system for relieving the increased pressure experienced in the intake air receiving area of the heating and ventilating system as a result of the vehicle movement.

In general, heating and ventilating systems in vehicles serve the purpose of keeping the vehicle window inner surfaces free from condensation and icing and providing as comfortable an environment as possible inside the vehicle. Since an individual's attentiveness and performance depends largely on his surroundings, it is important for general traffic safety that the driver of a vehicle operate in an environment which he finds comfortable.

A disadvantage of previously known heating and ventilating systems for vehicles has been their inability to maintain the interior of the vehicle at a temperature attained and felt to be pleasant, if the vehicle speed was changed. in all known heating and ventilating systems the temperature of the vehicle interior depends greatly upon vehicle speed and the driver's operating manner. If, for example, in a vehicle traveling at a speed of 50 km/hour and equipped with a known heating installation, a temperature considered to be pleasant prevails inside the vehicle due to a particular setting of the temperature control, the temperature will increase considerably with an increase in vehicle speed even though the setting of the temperature control remains unchanged. The increase may even be so large that the interior of the vehicle becomes extremely uncomfortable and the driver is forced to readjust the setting. If, on the other hand, a temperature considered to be pleasant prevails inside the vehicle at high speed, the temperature will drop substantially if the vehicle speed is reduced and the temperature setting remains unchanged. Here again, the driver will be forced to readjust the setting so as to create a comfortable surrounding in the vehicle interior. In situations where the vehicle speed must be changed constantly due to local driving conditions, present heating and ventilating systems must be continuously readjusted in order to create a comfortable environment in the vehicle interior. This constant readjustment of the heating and ventilating system to obtain the desired temperature requires considerable skill, generally available only to experienced drivers.

The temperature in the vehicle interior is dependent upon vehicle speed in present heating and ventilating systems, since air is supplied to the system through intake openings located somewhere in the frontal surface area of the vehicle. As the vehicle moves forward air enters the intake openings, passes through the heating and ventilating system and is delivered to the vehicle interior. Thus, at high speed, a substantially larger quantity of air is forced through the heating and ventilating system and delivered into the vehicle interior than at a lower speed. Obviously, the larger air quantity flows through the heating system at a higher speed than the small air quantity. Therefore, the more rapidly moving air spends less time in the heater and leaves the heating system with a lower temperature than the slower moving air. Although the outlet temperature of the more rapidly moving air is lower than that of the slower moving air, a larger quantity of heat is conveyed to the interior of the vehicle per unit time due to the greater quantity of air delivered to the vehicle interior by the more rapidly moving air. As a result of the larger quantity of heat conveyed, the inside temperature of the vehicle increases.

While the heating system delivers heat to the vehicle as described above, heat is removed from the vehicle by conduction to the outside atmosphere and the movement of air across the outer surface of the vehicle. The quantity of heat removed is determined by the difference in temperature between the interior of the vehicle and the outside atmosphere, the relative speeds of the air on the outer and inner vehicle surfaces, the coefficient of heat transfer from the inside air to the inner vehicle wall, the coefficient of thermal conductivity of the vehicle wall, and the coefficient of heat transfer from the outer vehicle wall to the outside atmosphere.

In the context of the following considerations the difference in temperature between the inside of the vehicle and the outside atmosphere is taken to be a constant. This is justified, since the interior vehicle temperature which the driver desires to maintain and the temperature of the outside atmosphere are both independent of vehicle speed.

The velocity of the air sweeping over the outer surface of the vehicle increases as vehicle speed increases. The increased velocity of the air passing over the outer surface of the vehicle results in a greater cooling effect and a larger quantity of heat removed from the vehicle. In other words, as vehicle speed increases, heat removed from the vehicle will increase. This can be demonstrated in greater detail.

As mentioned above, the inside and outside heat transfer coefficients have an effect on the transmission of heat from inside the vehicle to the atmosphere. Their respective values depend largely on the manner of flow on the various transfer surfaces. For example, the heat transfer coefficient of a laminar flow is different from that of a turbulent flow. The type of flow, in turn, depends upon the Reynolds number as determined by the flow velocity. Thus, the two heat transfer coefficients are functions of the flow velocities on the various transfer surfaces of the vehicle. Since an increase in vehicle speed results in a higher rate of air flow through the vehicle interior and across the vehicle outer surface, it is clear that both inner and outer heat transfer coefficients change in a direct relationship with any change in vehicle speed. As vehicle speed increases therefore, the overall coefficient of heat transmission will increase and a larger quantity of heat will be removed from the vehicle.

Summarizing to this point, it has been established that the delivery of heat to the interior of a vehicle for a given heater temperature setting and the removal of heat from the vehicle will both increase as the velocity of the vehicle increases. If the quantity of heat delivered to the vehicle interior and the quantity of heat removed from the vehicle interior were equal, the adjusted temperature would remain constant inside the vehicle. In practice however, the quantity of heat delivered and the quantity of heat removed are not balanced for varying vehicle velocities. As the vehicle velocity increases, the rate of heat delivery increases at a substantially greater rate than does the rate of heat removal. This results in an undesirable increase in the interior temperature of the vehicle.

Extensive work has been undertaken towards regulation or control of a heater output as a function of vehicle speed. Efforts to accomplish this have been directed towards taking measurements that can be used to throttle the heat supply as the vehicle speed increases so as to approximate the rate of the heat removal and thus attain a constant temperature in the vehicle interior, independent of vehicle speed. For example, heater installations using engine cooling water have been constructed wherein the water is controlled by means of an engine driven water pump. Since the number of revolutions of the water pump depends upon the speed of the engine, the quantity of water passed through the heater varies with the engine speed and thus, a variable quantity of heat is given off to the air passing over the heater coils. Unfortunately, the quantity of heat delivered by the heating system depends upon the speed of the engine but not the velocity of the vehicle. Attempts have also been made to decrease the output of the heating installation by throttling the quantity of water traveling through the heating system. The driver is thus forced to continuously adjust the throttling valve, depending on the change in engine speed. Since engine speed changes whenever the gears are shifted, constant readjustment of the throttle valve is required, a condition which yields the desired results only after long experience and a great deal of patience.

The above-described water control of the heater output was found to be unsatisfactory. The next alternative involved the attempt to control the temperature by controlling the quantity of air passing through the heater. As was indicated above, the volume of air delivered to the vehicle interior determines the quantity of heat delivered to the vehicle. The volume of air, in turn, depends upon the pressure, due to the vehicle speed, on the air intake openings of the heating and ventilating system. Previously proposals had been made to decrease the pressure by decreasing the air intake cross-sectional area. This approach however, results in an air flow insufficient to supply the required quantity of heat to the vehicle interior at lower vehicle speeds. It has also been proposed that the air intake openings be moved from the portion of the frontal surface area subject to the greatest pressure (in the center of the vehicle) towards the outer edges of the frontal surface area since the pressure decreases towards the periphery. Another proposal called for the reduction in pressure by the use of baffle plates to be suitably arranged in front of the air intake openings. These baffle plates were to partially deflect the incoming air from the intake openings and thereby produce a reduced pressure in the heating system. Apart from the fact that the baffle plates arranged in front of the air intake openings did not increase the esthetic appearance of the vehicle and constituted an unnecessary place for the collection of dirt, they also increased the risk of personal injury in accidents involving pedestrians. Further, it was not possible, either by means of the baffle plates or with the help of the other measures described above, to decrease the pressure in front of the air intake openings and thereby attain a vehicle interior temperature essentially independent of vehicle speed.

As described above, the air quantity flowing through the interior of a vehicle having a heating system without a blower, increases essentially in a linear manner as the vehicle speed increases. With the use of a blower however, the rate of air flow at higher vehicle speeds is less than with a heating system not having a blower. This is explained in that the blower even though operating, offers a resistance to the air flow. Within the various types of blowers available, a substantially better result is obtained from radial blowers than axial blowers, since radial blowers oppose the air flow over a larger area than axial blowers. Even though the provision of a blower in the heating system yields substantially improved results, the use of a blower alone does not provide the degree of air quantity control required to insure that the quantity of heat delivered to the vehicle interior by the heating system equals the quantity of heat removed by the surrounding environment. In other words, even if a blower is used, it is still not possible to attain a constant temperature in the interior of the vehicle independent of the velocity of the vehicle.

SUMMARY OF THE INVENTION

A primary object of the invention is to provide a heating and ventilating system of simple and economic design that permits the volume of air conveyed to the interior of a vehicle to be controlled such that the quantity of heat conveyed into the vehicle interior is substantially equal, without regard to vehicle speed, to the quantity of heat removed by the surrounding environment. In other words, by means of the invention, an inside vehicle temperature once attained and found to be pleasant, can be maintained constant, independently of the vehicle speed and without the need for constant readjustment of the heater control by the operator. The foregoing and other objects are attained in accordance with the invention by the provision of a connection from the heating and ventilating system air receiving area to a point on the negative pressure surface; the negative pressure surface being defined as that portion of the outer surface of the vehicle having a pressure less than atmospheric pressure due to the relative air velocity across the moving vehicle's outer surface. The pressure on a vehicle's negative pressure surface varies such that for each incremental increase in vehicle speed there will be experienced an incremental decrease in pressure below atmospheric pressure.

As a result of the connection from the air receiving area to the point on the surface of the vehicle having a pressure lower than atmospheric pressure, the pressure prevailing in the air receiving area, which is essentially equal to the pressure at the air intake openings at the front of the vehicle, is changed in response to a change in vehicle speed. By the invention, a reduction of the pressure in the air receiving area inversely proportional to a change in vehicle speed is simply and easily achieved. Since both the air receiving area and vehicle surface pressures change in a complimentary manner with a change in vehicle speed, it is possible to make the two effects balance each other. It is possible therefore, to deliver from the heating and ventilating system to the vehicle interior, without any special control devices or measures, and for every given vehicle velocity, an air volume such that the quantity of heat introduced to the interior of the vehicle equals the quantity of heat given off by the vehicle to the environment. In so doing, the invention enables the driver to maintain a substantially constant temperature he has found to be comfortable, independent of vehicle velocity, without any special control mechanisms and measures and without having to make constant adjustments to the heater controls.

If the point on the outer surface of the vehicle to which the air receiving area is connected, is placed in the clearance space between the vehicle body and a closed door, the opening will not be visible from the outside and will not be exposed to the influences of the weather. In addition, a connection through the vehicle body can be easily accomplished. Since essentially the same pressure prevails within the clearance space as on the outer surface of the vehicle, the effect of such installation will have no impact on the invention.

The connecting line from the point of lower pressure on the outer surface of the vehicle to the air receiving area, has the effect of a discharge line for reducing excessive pressure. It follows that pressure prevailing in the air collecting tank can be adjusted by a change in the cross-sectional area of the discharge line.

If the discharge line is provided with a closing shutter capable of being manually actuated, the cross-sectional area of the discharge line can be changed at will. This modification has the advantage that, depending on the driver, the air entering the vehicle interior can be rapidly raised to a desired temperature. As soon as the desired temperature has been attained, the driver can open the closing shutter and free the discharge line. At the instant the discharge line is opened, a volume of air is delivered to the vehicle interior such that the quantity of heat introduced to the interior of the vehicle is substantially equal the quantity of heat discharged to the environment for all vehicle speeds. By means of the simple actuation of a closing shutter, i.e., one simple maneuver by hand, the heating and ventilating system is changed from a setting for rapid heating to a setting for constant interior temperature at varying vehicle speeds. In the event that for some reason, the outside temperature should drop rapidly and an adjustment of the heater in response to the changed temperature condition be required, the closing shutter need only to be closed in order to attain the maximum possible heat output.

The above discussion assumes that the temperature difference between the vehicle interior and the outside temperature remains constant. Obviously, a significant change in outside temperature requires a change in the temperature control of the heating and ventilating system.

BRIEF DESCRIPTION OF THE DRAWINGS

An understanding of the invention can be gained from a consideration of the following detailed description of the preferred embodiments thereof, in conjunction with the appended drawings, wherein:

FIG. 3 is a graph comparing air flows in heating and ventilating systems equipped with blowers (curve G) and heating and ventilating systems modified in accordance with the invention (curve H) with the band of air flow values found to provide a comfortable temperature in the vehicle interior (band between curves E and F), plotted against vehicle speed.

DESCRIPTION OF THE PREFERRED EMBODIMENTS

Figure 1:
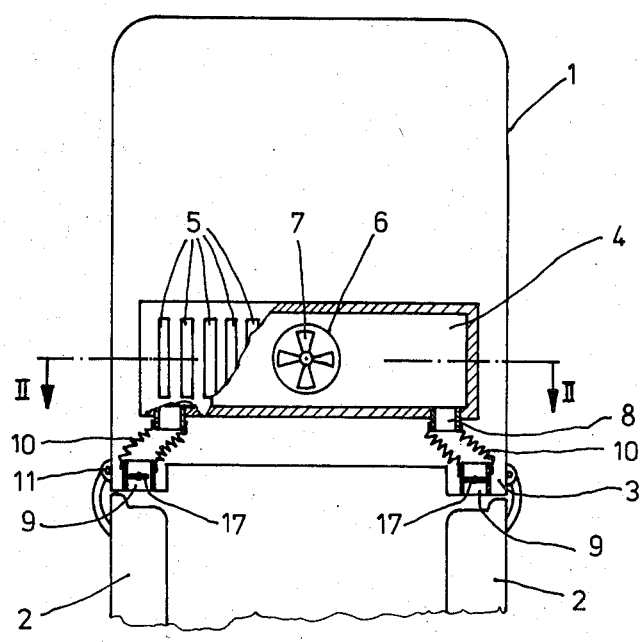
FIG. 1 is a plan view of the front portion of a vehicle provided with a heating and ventilating system in accordance with the invention.
Figure 2:
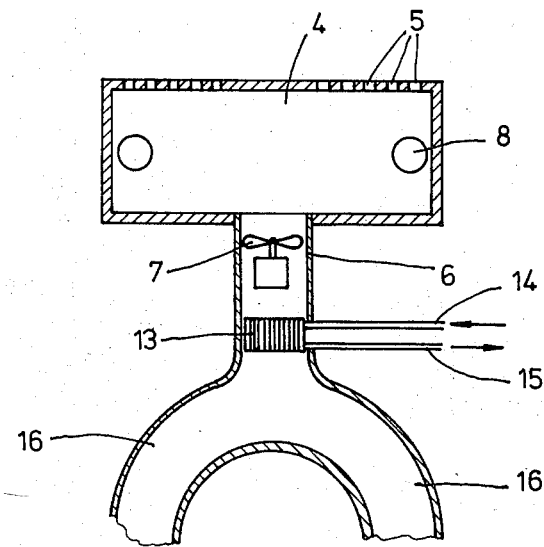
FIG. 2 is a cross-section taken through the invention at line II—II in FIG. 1.

In FIG. 1, the front portion of a vehicle 1 is indicated typically as having doors 2 mounted by way of hinges 11 on the vehicle door frame 3. The vehicle, being equipped with a heating and ventilating system in accordance with the invention, is represented diagramatically in FIGS. 1 and 2 as having an intake air receiving area shown as an air collecting tank 4 of suitably selected volume and configuration and intake air openings 5 in communication with the outside air. The intake air openings 5 provide the heating and ventilating system with its air supply and are located so as to open on the frontal surface area of the vehicle thereby using the vehicles forward motion to force air into the system. The air collecting tank is connected with the vehicles interior by such suitable means as, for example, an air outlet channel 6 that separates into two or more lines 16 in order to distribute heated air to the vehicle interior more effectively. Within the channel 6 are arranged a conventional axial blower 7 and a suitable heat exchanging device 13. In this application, the heat exchanging device 13 is represented as a coil supplied by engine cooling water. In systems of this kind, hot water from the engine cooling water system enters the coil through line 14 and is returned to the system through line 15. Water flow through the heat exchanging coil 13 could be maintained by proper design of the engine cooling water system as is current practice or by provision of a circulating water pump not shown in the drawings.

The air collecting tank 4 is provided with a communication to the outer surface of the vehicle. This may be one or more outlets 8 fitted with conventional flexible hose discharge lines 10 or other suitable passages leading to openings 9. The openings 9 are located to take advantage of the "negative pressure effect" experienced at certain portions of the vehicle's surface when the vehicle is in motion as described above. The openings 9 are preferably located in the vehicle door frames 3 of the side doors 2. Behind the openings 9 are provided closing shutters 17 which can be manually actuated by means of adjusting means not shown here.

FIG. 3, diagramatically illustrating the operation of a heating and ventilating system such as that just described, shows curves E and F representing the range of air flow values found to result in substantially constant, comfortable vehicle interior temperatures at various vehicle speeds. curve G, appearing as a broken line, represents the quantity of air passing through a conventional heating and ventilating system equipped with a blower, plotted against vehicle speed. Curve H, displayed in dots and dashes, represents the quantity of air passing through a heating and ventilating system modified in accordance with the invention. All curves in FIG. 3 are plotted against vehicle speed.

In operation, air is forced into the air collecting tank 4 by the combined effect of the vehicle's forward motion and the intake air openings 5 located in the frontal surface area of the vehicle. In view of the fixed cross-sectional area of the intake air openings 5 the quantity of air supplied in this manner varies in direct proportion to the vehicle speed. This relationship for conventional heating and ventilating systems is shown in curve G of FIG. 3. The air supplied to the heating and ventilating system is collected in the air collecting tank 4. In order to prevent pressure buildup at higher vehicle speeds in the air collecting tank 4, the air is vented in accordance with the invention by way of the outlets 8, the flexible hose discharge lines 10 and the openings 9. The openings 9, opening onto the clearance space between the vehicle door frames 3 and the side doors 2, are subject to a pressure that varies inversely as the speed of the vehicle and is less than atmospheric pressure when the vehicle is in motion. In effect, there is connected to the air collecting tank 4 by the above described venting method, a vacuum pump that withdraws the excess air in the tank 4 and discharges it to the atmosphere. Since the negative pressure at the openings 9 increases as the vehicle speed increases, more air is withdrawn at higher vehicle speeds. The net effect of the variable air supply being balanced by the variable air withdrawn in accordance with the invention, is a sharply reduced pressure buildup in the air collecting tank at higher vehicle speeds. This reduced pressure buildup is represented in FIG. 3 by the lower slope of curve H as compared to curve G. The existance of a relatively constant pressure in the air collecting tank 4, permits the axial blower 7 to control more completely the quantity of air forced into the vehicle interior and thereby convey to the vehicle interior a quantity of air that closely approximates the quantity required to maintain a constant interior temperature without regard to vehicle speed. Accordingly, the axial blower 7 pulls air from the air collecting tank 4 and forces it through the heat exchanging coils 13 and into the vehicle interior through lines 16. As the air passes over the heat exchanging coils 13, heat is transferred by conduction, from the coils to the air and the warmed air then serves to heat the interior of the vehicle.

Obviously, the pressure relieving function performed by the venting method described in accordance with the invention would be effective provided the openings 9 were located at any point on the outer surface of the vehicle that is subject to the negative pressure effect. The preferred embodiment described herein utilizes the clearance space between the vehicle door frames 3 and the closed side doors 2. This arrangement is preferable for aesthetic and functional reasons. The opening 9 is not visible in this location and it is protected from contamination and clogging by the elements.

The discharge line 10 is provided with a manually controlled opening shutter 17 in order that the flow of air from the air collecting tank 4 to the atmosphere can be interrupted. The control of the shutter 17 can be accomplished by a cable actuating means or other known methods and may be arranged to permit the operator of the vehicle to open or close the shutters at will. If the shutter is closed, the air collecting tank 4 overpressure is not reduced and the maximum air flow (see curve G of FIG. 3) will pass through the heating and ventilating system. The vehicle interior will in this manner be rapidly heated to the desired temperature. As soon as the desired temperature has been attained, the opening shutters 17 can be opened, relieving the overpressure in the air collecting tank and allowing an air flow quantity to enter the vehicle interior (see curve H of FIG. 3) sufficient to maintain the interior temperature at a constant predetermined value. In this way, no heater controls must be adjusted, provided the outside temperature has not varied substantially from the value existing when the last heat adjustment was made, and the interior temperature of the vehicle will remain essentially constant regardless of vehicle speed.

The achievement by the invention of the objective of an essentially constant interior vehicle temperature independent of vehicle speed, may also be demonstrated by considering the curves of FIG. 3. The band of air flow quantities defined by the area between curves E and F represent the temperature comfort range in the vehicle interior. At slower speeds less air is required to keep the vehicle interior at a desired temperature as compared to higher speeds, simply because there are fewer losses to the environment at the lower speed. As vehicle speed increases therefore, the quantity of air required to be introduced to the vehicle interior increases to account for higher losses to the environment. The requirements increase, as represented by curves E and F, is nevertheless far below the actual air flow increase experienced in a vehicle equipped with a heating and ventilating system having a blower as represented by curve G.

Comparing the E-F band with curve G, it is apparent that at speeds below 50 km/hour the air flow experienced is somewhat below the quantity required to heat the vehicle interior to a comfortable temperature. Curve G is typical of the ordinary blower assisted heating system. The area in which this system provides comfortable conditions may be the result of a design compromise required to be made because of the steep slope of the G curve. At lower speeds, 20 km per hour and below, air flow to the vehicle interior is primarily determined by the axial blower 7. Forward motion of the vehicle soon takes over however, and the quantity of air introduced to the vehicle interior becomes a function of vehicle speed. In order to have the air quantity flowing through currently known heating and ventilating installations approach the value required for interior temperature comfort for as great a speed range as possible, the design determination is made to install a low capacity fan in the system, making the air flow at low speeds insufficient. In this way, the air flow does not exceed the comfort requirements until the vehicle exceeds 80 km/hour. If a higher capacity fan were used in a conventional installation to insure a sufficient air flow at lower vehicle speeds, the G curve would be moved up and, due to its steep slope, pass out of the comfort range even sooner than it now does.

The air flow in a vehicle modified in accordance with the invention (as represented by curve H) exhibits far superior air flow characteristics. Because of the venting system, comprising, in FIG. 2's example, outlets 8, the flexible hose discharge lines 10, the closing shutters 17 and the openings 9, the pressure buildup in the air collecting tank 4 is to a large extent relieved as discussed above. At lower vehicle speeds, the vehicle is able to be equipped with a higher capacity axial blower 7 due to the rate of increase in air flow as vehicle speed increases, thereby enabling sufficient air to enter the vehicle to maintain the interior temperatures at a comfortable level. Yet the quantity of air introduced to the vehicle interior does not climb out of the comfort range until the vehicle has exceeded 130 km/hours, by which time a car not modified in accordance with the invention, would be extremely uncomfortable without a temperature adjustment to the heater controls having been made by the vehicle operator.

Therefore, by means of the invention, it is possible to maintain an essentially constant interior vehicle temperature without regard to vehicle speed and without the necessity for constant heating system temperature adjustments.

Many other embodiments of the invention will readily occur to those skilled in the art on consideration of this disclosure. Accordingly, the invention is to be construed as including all modifications to the invention that fall within the scope of the appended claims.

I claim:

1. In a heating and ventilating system for an automotive vehicle having a negative pressure surface, the negative pressure surface being that portion of the outer surface of the vehicle subject to a pressure varying inversely as the speed of the vehicle and being less than atmospheric pressure when the vehicle is in motion; an air collecting tank, at least one air intake opening located in the frontal surface area of the vehicle and connected to provide air to the air collecting tank, at least one air discharge opening located in the interior of the vehicle and connected to provide air from the air collecting tank to the interior of the vehicle, and blower means for forcing air from the air collecting tank to the interior of the vehicle; the improvement which comprises a means permitting gaseous flow connecting a point on the negative pressure surface with the air collecting tank whereby the increased pressure of the air collecting tank at higher vehicle speeds is relieved by withdrawal of the excess air from the tank to the atmosphere, due to the lower pressure at the negative pressure surface.

2. The arrangement according to claim 1, wherein the gaseous flow means comprises a flexible tubing.

3. The arrangement according to claim 1, wherein the point on the negative pressure surface comprises an area opening onto the clearance space between the vehicle body and a closed vehicle door.

4. The arrangement according to claim 1, wherein the gaseous flow means is provided with manually operable closing means.

5. The arrangement according to claim 1, wherein the connection from the air collecting tank to the air discharge opening includes a heat exchanging coil whereby heat supplied from an external source is delivered to the interior of the vehicle.

* * * * *

UNITED STATES PATENT OFFICE
CERTIFICATE OF CORRECTION

Patent No. 3,799,435     Dated  MARCH 26, 1974

Inventor(s)  PAUL MOHR

It is certified that error appears in the above-identified patent and that said Letters Patent are hereby corrected as shown below:

FIRST PAGE, ITEM 30, "SEPT. 1, 1972 GERMANY 2142732" SHOULD BE --SEPT. 1, 1971 GERMANY 2143732--;

COL. 1, LINE 24, "in" SHOULD BE --In--;

COL. 6, LINE 50, "curve" SHOULD BE --Curve--.

Signed and sealed this 17th day of September 1974.

(SEAL)
Attest:

McCOY M. GIBSON JR.
Attesting Officer

C. MARSHALL DANN
Commissioner of Patents